UNITED STATES PATENT OFFICE.

KURT KOTTMANN, OF BERNE, SWITZERLAND, ASSIGNOR TO SOCIETY OF CHEMICAL INDUSTRY IN BASLE, OF BASEL, SWITZERLAND.

COMBINATION OF METALS WITH ALBUMENS.

1,371,380.  Specification of Letters Patent. Patented Mar. 15, 1921.

No Drawing.  Application filed September 27, 1916. Serial No. 122,355.

*To all whom it may concern:*

Be it known that I, KURT KOTTMANN, a citizen of the Swiss Republic, and resident of Berne, Switzerland, have invented new and useful Combinations of Metals with Albumens, of which the following is a full, clear, and exact specification.

I have found that albumen compounds derived from the pathologically and physiologically modified human or animal organs and tissues, as carcinomas and other tumors, syphilitically or otherwise infectiously modified tissues, tuberculous organs, placentas, etc., can be converted by their treatment with metals or metal compounds into well defined combinations of metals with albumens, which have proved to be valuable agents to diagnose maladies resulting from pathological modifications of certain organs, from pregnancy, etc., and are further capable of being used therapeutically. Instead of the above specified albumen compounds their products of decomposition can be transformed into metal compounds.

The preparation of the combinations of metal with albumens is obtained by reacting with metals or metal compounds on the albumen compounds prepared according to known methods from the organs or tissues or on their products of decomposition and by removing, if necessary, in a suitable manner, the metal added in excess. The obtained combinations are well defined substances containing a determinated percentage of metal bound in a masked, respectively not ionized form and possessing still the specific properties of the albuminous bodies employed as parent materials. By treating the obtained combinations of metals and albumens with specifically decomposing ferments or ferment-like substances, they are specifically decomposed, the metal being freed so that it can be detected by the usual reagents. This property qualifies the said combinations of metals and albumens in a high degree for detecting ferments decomposing albumens occurring in certain cases of normal and pathologic modifications of the human or animal organism, consequently for diagnosing pregnancy, cancer, tuberculosis, syphilis, epilepsy, etc. The obtained combinations of metals and albumens can further be used for therapeutical purposes.

The preparation of the new combinations is illustrated by the following examples:

Example 1.

*Combination of iron with placenta albumen.*

A fresh human placenta is freed from blood according to known processes, minced, degreased and boiled with distilled water till the wash-water shows no further ninhydrin reaction. The placenta albumen compound thus boiled out is passed through a fine meshed sieve and put in suspension into a small quantity of water. To the obtained suspension are added, while strongly stirring, 20 cubic centimeters of an iron chlorid solution of 30 per cent. and the mass is allowed to stand for several hours. Thereafter the combination of iron and placenta albumen thus obtained is washed out with water till the wash-water becomes completely free of iron. This combination is then deposited for ¼ of an hour in acetone. After the acetone has been eliminated by suction, the combination is dried in a high vacuum for 3 hours, at a water-bath temperature of 70° C., triturated in a grinding cup and sifted through a narrow meshed metal sieve and filled in proportions of 0.1 gr. into tubes of Jena-glass free of alkali, which are closed by melting and sterilized for 2 hours at 105° C.

The substance thus obtained is a fine, brownish powder which contains the iron bound in a masked not ionized form and is insoluble in water and the usual organic solvents.

Example 2.

*Combination of copper with placenta albumen.*

A fresh human placenta is freed from blood according to known processes, minced, degreased and boiled with distilled water till ½ liter wash-water concentrated to 1 cubic centimeter gives no further reaction with 1 cubic centimeter of a ninhydrin solution of 1 per cent. The placenta albumen compound thus boiled out is passed through a fine meshed sieve and put in suspension in a small quantity of water. To the obtained suspension is added, while strongly stirring, an excess of copper sulfate solution of 20 per cent. and the mass is allowed to stand for several hours. Thereafter the mass of reaction must still contain a detectable excess of copper sulfate. Then the formed combination of copper and placenta albumen is washed out with water till 2 liters of wash-water concentrated to 10 cubic centimeters show no further copper reaction. The combination is then deposited for ¼ of an hour in acetone. After the acetone has been eliminated by suction the combination is dried for 3 hours, in a high vacuum, at a water-bath temperature of 70° C. Finally the same is triturated in a grinding cup, sifted through a fine-meshed sieve and sterilized for 2 hours at 105° C. The substance obtained is a fine, slightly greenish colored powder, which contains the copper in a masked, not ionized binding and is insoluble in water and the usual organic solvents.

Example 3.

*Combination of chromium with placenta albumen.*

The combination of placenta albumen, prepared as described in the foregoing example from human placenta and which shows no further ninhydrin reaction, is set in suspension in water and to the obtained suspension is added, while stirring, an excess of a chromium alum solution of 15 per cent. After the mass has been allowed to stand for several hours, the formed chromium compound is freed, by washing with water, from the excess of chromium alum and dried and sterilized as described in Example 2. The obtained combination of chromium and placenta albumen is in the form of a fine light brown powder insoluble in water and most of the organic solvents.

Example 4.

*Combination of mercury with placenta albumen.*

The combination of placenta-albumen prepared as specified in the foregoing examples, is suspended in water and to the obtained suspension is added an excess of a mercury chlorid solution of 2.5 per cent. After the mass has been allowed to stand for several hours, the formed combination of mercury and placenta albumen is washed with water till no further mercury can be detected in the wash-water. The substance dried in the described manner forms a fine, nearly colorless powder.

Example 5.

*Combination of silver with placenta albumen.*

A placenta albumen combination showing no ninhydrin reaction is suspended into water, and to the obtained suspension is added while stirring an excess of silver nitrate solution of 16 per cent., after which the mass is allowed to stand for several hours. Thereafter the formed combination of silver and placenta albumen is washed with water till the wash-water is free of silver. The substance dried and sterilized in the above specified manner forms a fine slightly brownish colored powder, which is insoluble in water and the usual organic solvents.

Example 6.

*Combination of gold with placenta albumen.*

To the aqueous suspension of placenta albumen combination showing no ninhydrin reaction is added an excess of gold chlorid solution of 1 per cent. The combination of gold and placenta albumen after having been washed till it is free of gold and then dried as above described, forms a fine, light-gray powder insoluble in water and most of the organic solvents.

Example 7.

*Combination of iron with carcinoma albumen.*

Carcinoma tumors are extracted with scissors and knife, freed from blood in the known manner, minced, degreased, boiled with water and pressed through a fine-meshed sieve. The substance obtained is set in suspension into a small quantity of water and to this are added 5 cubic centimeters of iron chlorid solution of 30 per cent. The mass is allowed to stand for 4 hours and freed by washing from the iron chlorid in excess. The obtained substance is then left for a short time in acetone and after the latter has been separated by suction the substance is dried in a high vacuum at a water-bath temperature of 70° C. The combination of iron and carcinoma albumen obtained, after sterilization, is a fine, brownish powder insoluble in water and the usual organic solvents.

Example 8.

*Combination of copper with carcinoma albumen.*

The carcinoma tumors are extracted with scissors and knife, freed from blood in the known manner, minced, degreased and afterward boiled till ½ liter of the liquid concentrated to 1 cubic centimeter gives no further reaction with 1 cubic centimeter of ninhydrin solution. The mass is then pressed through a fine-meshed sieve and the carcinoma albumen combination is suspended in a small quantity of water. To the thus obtained suspension is added an excess of a copper sulfate solution of 20 per cent. and the mass is allowed to stand for 4 hours. The combination of copper and carcinoma albumen obtained is washed with water till the wash-water does not show a further copper reaction. It is next suspended for some time in acetone, the acetone is eliminated by suction and the remaining residue is dried in a high vacuum at a water-bath temperature of 70° C. After complete pulverization the combination of copper and carcinoma albumen is obtained in the form of a greenish-yellow powder which contains the copper in a masked, not-ionized binding and is insoluble in water and in the usual organic solvents.

Example 9.

Combination of iron with tuberculosis albumen.

Tuberculous centers of human lungs are extracted with scissors and knife, freed from blood according to known processes, minced, degreased and boiled with water until ½ liter of the liquid concentrated to 1 cubic centimeter gives no further reaction when 1 cubic centimeter of ninhydrin solution is added thereto. The tuberculous albumen combination is thereafter pressed through a fine-meshed sieve and suspended in water and to the obtained aqueous suspension is added an excess of iron chlorid solution of 30 per cent. After the mass has been allowed to stand for 4 hours, the combination of iron and tuberculosis albumen is washed with water until it is free of iron and dried and sterilized as above specified. It is thus obtained in form of a brownish powder.

Example 10.

Combination of copper with tuberculosis albumen.

The tuberculosis albumen combination boiled with water until no further reaction with ninhydrin occurs, as described in the foregoing example, is suspended in water and to the resulting aqueous suspension is added, while stirring, an excess of copper sulfate solution of 20 per cent. After the excess of copper sulfate has been removed by washing with water, the mass is dried and sterilized as specified above.

The thus prepared combination of copper and tuberculosis albumen constitutes a greenish-yellow powder insoluble in water and the usual organic solvents.

Example 11.

Combination of iron with the albumen of syphilitic organs.

Syphilitic child liver is minced and freed from blood according to known processes and boiled with water until 2 liters of the liquid concentrated to 1 cubic centimeter give no further reaction with 1 cubic centimeter of a ninhydrin solution of 1 per cent. To the substance suspended in water is added an excess of iron chlorid solution of 30 per cent. and the mass is allowed to stand for several hours, washed thereafter with water until the iron in excess is removed, freed from water with acetone, dried in vacuo, pulverized, sieved and sterilized for 1 hour at 165° C. The new combination is a fine, brownish powder containing the iron bound in a masked, not ionized form.

Example 12.

Combination of copper with the albumen of thyroid gland.

The thyroid glands pathologically modified are minced and freed from blood in known manner and boiled with water until 2 liters of the liquid concentrated to 1 cubic centimeter give no further reaction with 1 cubic centimeter of a ninhydrin solution of 1 per cent. To the substance suspended in water is added an excess of a copper sulfate solution of 20 per cent., the mass is allowed to stand for several hours and washed afterward with water till the copper in excess is removed, freed from water with acetone, dried in vacuo, pulverized, sifted and sterilized for 1 hour at 105° C. The new copper compound is a fine light-greenish powder containing the copper in a masked, not ionized binding.

Example 13.

Combination of iron with the product of decomposition of placenta albumen.

A fresh human placenta is freed from blood in a known manner, minced, degreased and boiled with distilled water until ½ liter of the wash-water concentrated to 1 cubic centimeter shows no further reaction with 1 cubic centimeter of a ninhydrin solution of 1 per cent. The substance is then suspended in about 150 cubic centimeters of a sodium carbonate solution of 9 per cent. and to the thus obtained suspension is added an aqueous solution of 1 gr. of trypsin. The obtained mixture is thoroughly stirred, covered with a layer of toluene and placed for 20 hours in a vessel maintained at a constant temperature of 38° C. The layer of toluene is then removed, the solution filtered through wadding and to the filtered liquid is added an excess of an iron chlorid solution of 30 per cent., whereby the new iron combination is precipitated. This latter is separated by filtration, freed from excess of iron chlorid by washing with water, treated with acetone, dried in vacuo at a water-bath temperature of 70° C., pulverized, sifted and sterilized for ½ hour at 105° C. The resulting product is a brownish powder, which is insoluble in water and most of the organic solvents.

*Example 14.*

*Combination of copper with the product of decomposition of placenta albumen.*

To the solution of the product of decomposition of placenta albumen prepared according to the foregoing example and separated from the toluene is added an excess of a copper sulfate solution of 20%, whereby the combination of copper and the product of decomposition of placenta albumen is precipitated. The preparation freed in the described manner from the copper sulfate in excess and dried is a greenish-gray powder.

In an analogous manner is effected the preparation of the combination of metals with the albumen combinations of other pathologically or physiologically modified organs or tissues or with their products of decomposition. Hereby the albumen combination can also be employed in form of juices pressed out of the physiologically or pathologically modified organs or tissues.

The application for diagnostic purposes of the metal-albumen combinations thus obtained, consists in treating them with the ferment solution to be examined and in detecting by means of well known reactions the metal which has possibly been liberated; this is shown by the following examples:

*Example a.*—0.1 gr. of the iron-placenta-albumen combination prepared as described in Example 1 is added to 2 ccm. of the serum obtained from the blood of the subject to be examined; the mixture is covered with 5 ccm. of toluene and placed for 16 to 24 hours in an incubator at a temperature of 39° to 42° C.; the toluene is removed and the serum poured on a filter, which is iron-free and which has been moistened with distilled water; the filtrate is completed to 4 ccm. and mixed with 2 ccm. of a 25% solution of hydrochloric acid (also iron-free).

After addition of 2 ccm. of a 5% solution of potassium ferrocyanid, and stirring, it is possible to detect whether the serum is that of a pregnant or non-pregnant subject, seeing that in the former case a blue coloration appears through liberation of ionized iron.

*Example b.*—0.1 gr. of copper-placenta-albumen combination prepared as per Example 2 is added to 2 ccm. of the serum obtained from the blood of the subject to be examined; the liquid is well stirred with a clean glass rod; the mixture is covered with 4 ccm. of toluene; the testing-tube is then stoppered with a pad of cotton-wool and placed for 18 to 24 hours in an incubator at 40-42° C.; the toluene is then removed, the serum filtered through a moistened filter; the volume of the filtrate is completed to 3 ccm. with distilled water and treated with 2 ccm. of 25% hydrochloric acid, stirring well; the liquid is again filtered, the filtrate completed to 3 ccm. to which 5-6 drops of a 5% solution of potassium ferrocyanid are added. The reaction is positive, if the solution shows a blue violet coloration.

What I claim is:

As new products the herein described combinations of metals with albumens obtained from abnormal animal cellules, capable for being used for diagnostic and therapeutic purposes, constituting slightly colored powders insoluble in water and the usual organic solvents, containing the metal in a non-ionized condition and from which the metal is liberated by their treatment with specifically decomposing ferments or ferment-like substances obtained from abnormal animal organs or tissues and can be detected by the usual methods.

In witness whereof I have hereunto signed my name this 7th day of September 1916, in the presence of two subscribing witnesses.

K. KOTTMANN.

Witnesses:
 H. T. STEHLIN,
 FRITZ UHLMANN.